United States Patent
Allochis

(10) Patent No.: US 8,567,168 B2
(45) Date of Patent: Oct. 29, 2013

(54) CROP HEADER WITH LATERAL FINGERS AND HOOD ARTICULATED

(76) Inventor: José Luis Allochis, Buenos Aires (AR)

(*) Notice: Subject to any disclaimer, the term of this patent is extended or adjusted under 35 U.S.C. 154(b) by 0 days.

(21) Appl. No.: 13/097,778

(22) Filed: Apr. 29, 2011

(65) Prior Publication Data

US 2011/0277436 A1 Nov. 17, 2011

(30) Foreign Application Priority Data

May 11, 2010 (AR) .............................. P20100101626

(51) Int. Cl.
*A01D 45/02* (2006.01)

(52) U.S. Cl.
USPC ............................................................ 56/109

(58) Field of Classification Search
USPC ......... 56/109, 119, 314, 318, 319, 17.3, 17.4, 56/94, 320.1, 327.1, DIG. 20, DIG. 24
See application file for complete search history.

(56) References Cited

U.S. PATENT DOCUMENTS

| | | | | |
|---|---|---|---|---|
| 4,084,396 A * | 4/1978 | Fritz et al. | ......................... | 56/98 |
| 4,446,682 A * | 5/1984 | Jennen et al. | .................... | 56/119 |
| 4,553,379 A * | 11/1985 | Kalverkamp | ..................... | 56/60 |
| 4,598,535 A * | 7/1986 | Sousek | .............................. | 56/98 |
| 5,775,076 A * | 7/1998 | Mossman | ........................ | 56/119 |
| 5,845,472 A * | 12/1998 | Arnold | .............................. | 56/94 |
| 5,865,019 A * | 2/1999 | Hurlburt et al. | .................. | 56/119 |
| 6,247,297 B1 * | 6/2001 | Becker | ............................. | 56/119 |
| 6,715,273 B2 * | 4/2004 | Weichholdt | ..................... | 56/314 |
| 7,350,345 B2 * | 4/2008 | Slabbinck et al. | .............. | 56/119 |
| 2002/0035826 A1 * | 3/2002 | Albinger et al. | ................. | 56/109 |
| 2003/0056482 A1 * | 3/2003 | Weichholdt | ..................... | 56/314 |
| 2004/0107684 A1 * | 6/2004 | Slabbinck et al. | .............. | 56/119 |
| 2007/0193242 A1 * | 8/2007 | Kost et al. | ........................ | 56/119 |
| 2009/0025354 A1 * | 1/2009 | Guldenpfennig et al. | ...... | 56/119 |

* cited by examiner

*Primary Examiner* — Thomas B Will
*Assistant Examiner* — Mai Nguyen
(74) *Attorney, Agent, or Firm* — Defillo & Associates, Inc.; Evelyn A. Defillo

(57) ABSTRACT

Crop header with lateral fingers and hood articulated which particular structure facilitates time reduction during the task of inspection of the transport commands or auger activations of the crop header thereby contributing to the rotation or turn of aforementioned lateral fingers, enabling an easy access to the commands or auger activations. In the machine the lateral fingers (A) and hood (8) are arranged in an articulated form in relation to the piece that contains the transport auger, and preferably, lateral fingers (A) and hood (8) articulate in a way that their longitudinal axles (A1) are displaced on a substantial horizontal level.

4 Claims, 9 Drawing Sheets

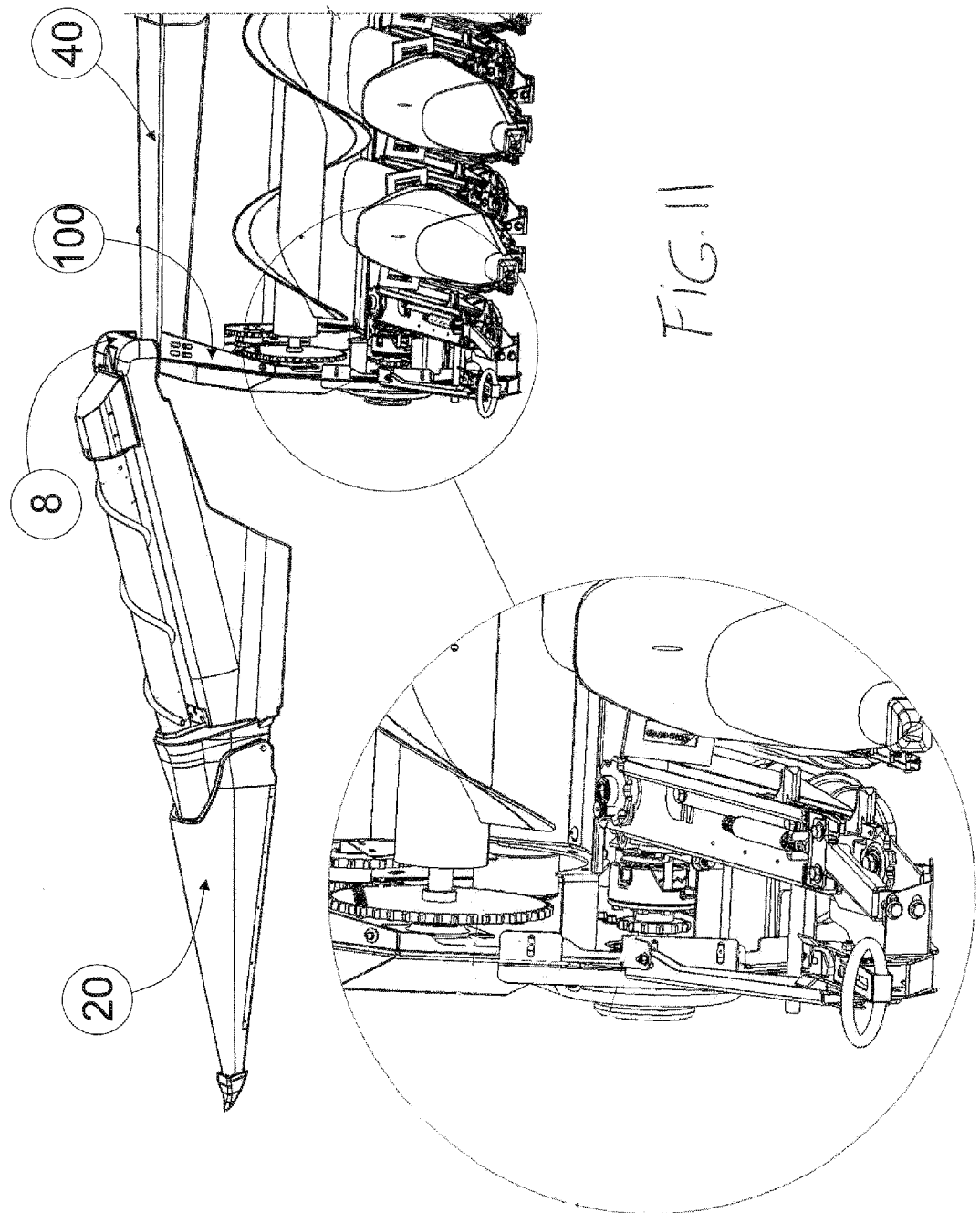

CROP HEADER WITH LATERAL FINGERS AND HOOD ARTICULATED

TECHNICAL FIELD OF THE INVENTION

The present invention refers to a crop header with lateral fingers and hood articulated which particular structure facilitates time reduction during the task of inspection of transport commands or auger activations of the crop header thereby contributing to the rotation or turn of aforementioned lateral fingers, enabling an easy access to the commands or auger activations.

TECHNICAL FIELD AND PROBLEMS TO SOLVE

In relation to the related art of the present invention, it is not known any crop header that incorporates lateral fingers and hood turn able or articulated, which movement allows a better access to the activation mechanisms of the combine harvester auger.

Taking into account the difficulty for the access to these mechanisms, it is the main objective of this invention to provide a hood and lateral fingers with turn characteristics towards the header sides, facilitating in an execution form with a turning centre in the back end and of a simple lock trigger in the front end. This job lasts only some seconds.

BRIEF DESCRIPTION OF THE DRAWINGS

In order for this invention to be clearly understood and it does not exist any inconvenient to be carried out, it will be described in detail, making reference to the illustrative pictures, in which:

FIG. 11 illustrates a perspective front view of the left lateral finger including a detailed view of the action controls of the crop header.

In all the figures, the same reference numbers indicate the same or corresponding elements.

DETAILED DESCRIPTION OF THE INVENTION

Figure 1:
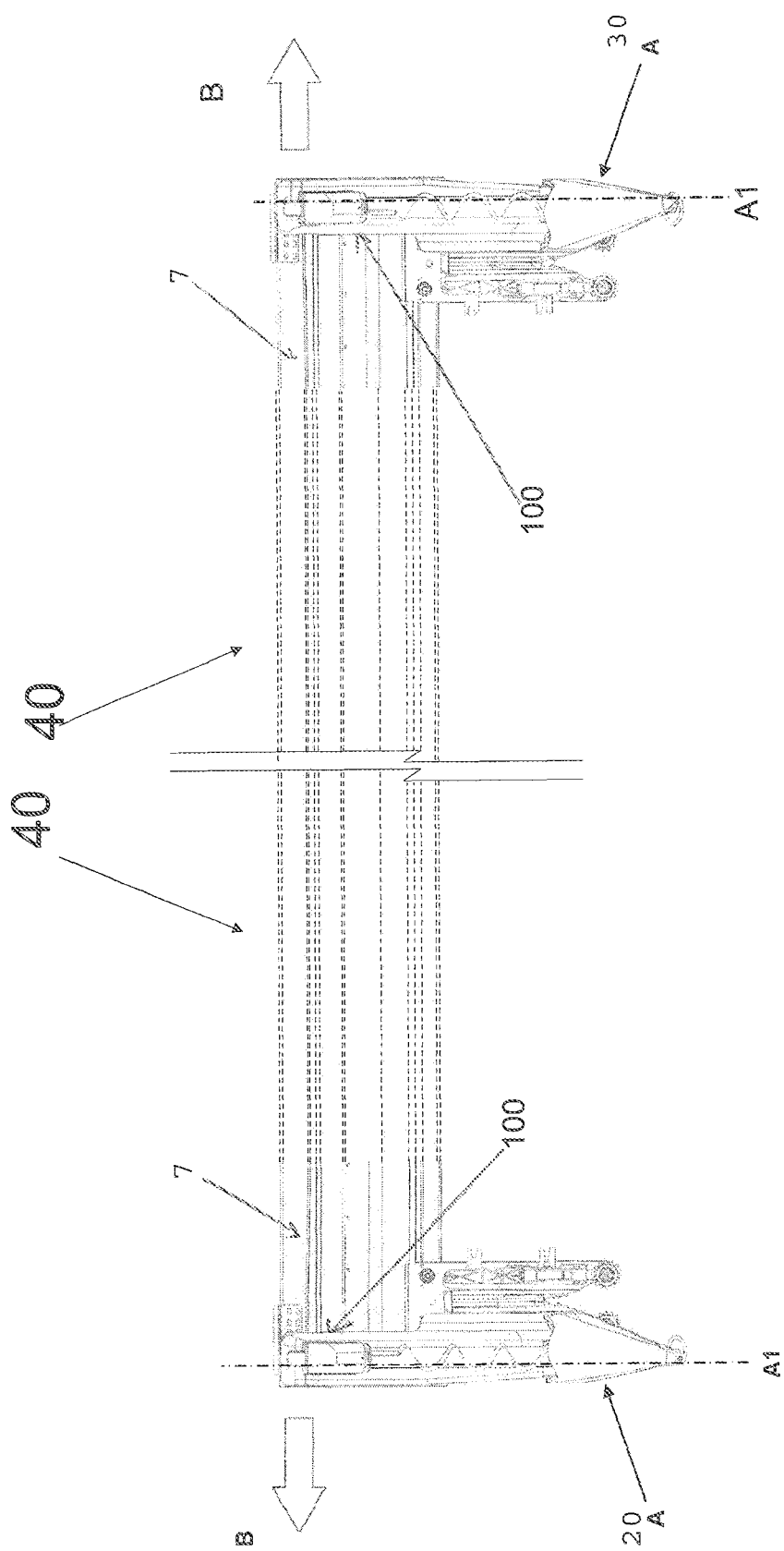
FIG. 1 illustrates a top view of lateral fingers and hood for a crop header according to the present invention.

FIG. 1 shows a left lateral finger 20 and a right lateral finger 30 of a crop header 40. The left lateral finger 20 and the right lateral finger 30 are located perpendicularly to the edge 100 of the crop header 40. The arrows B show the movement direction of the left lateral finger 20 and the right lateral finger 30.

The structure, function, and operation of right lateral finger 30 is identical to the structure, function, and operation of left lateral finger 20.

Figure 2:
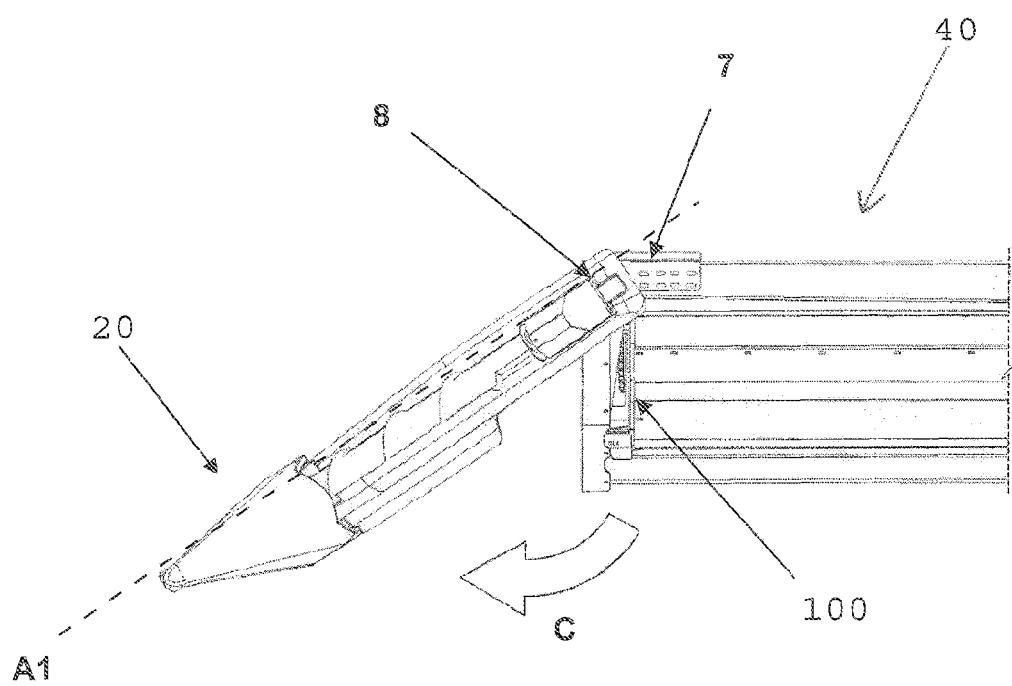
FIG. 2 illustrates a top view showing a partial cut of the left lateral finger and hood in its turning-trajectory towards the crop header sides of the according to the present invention.
Figure 3:
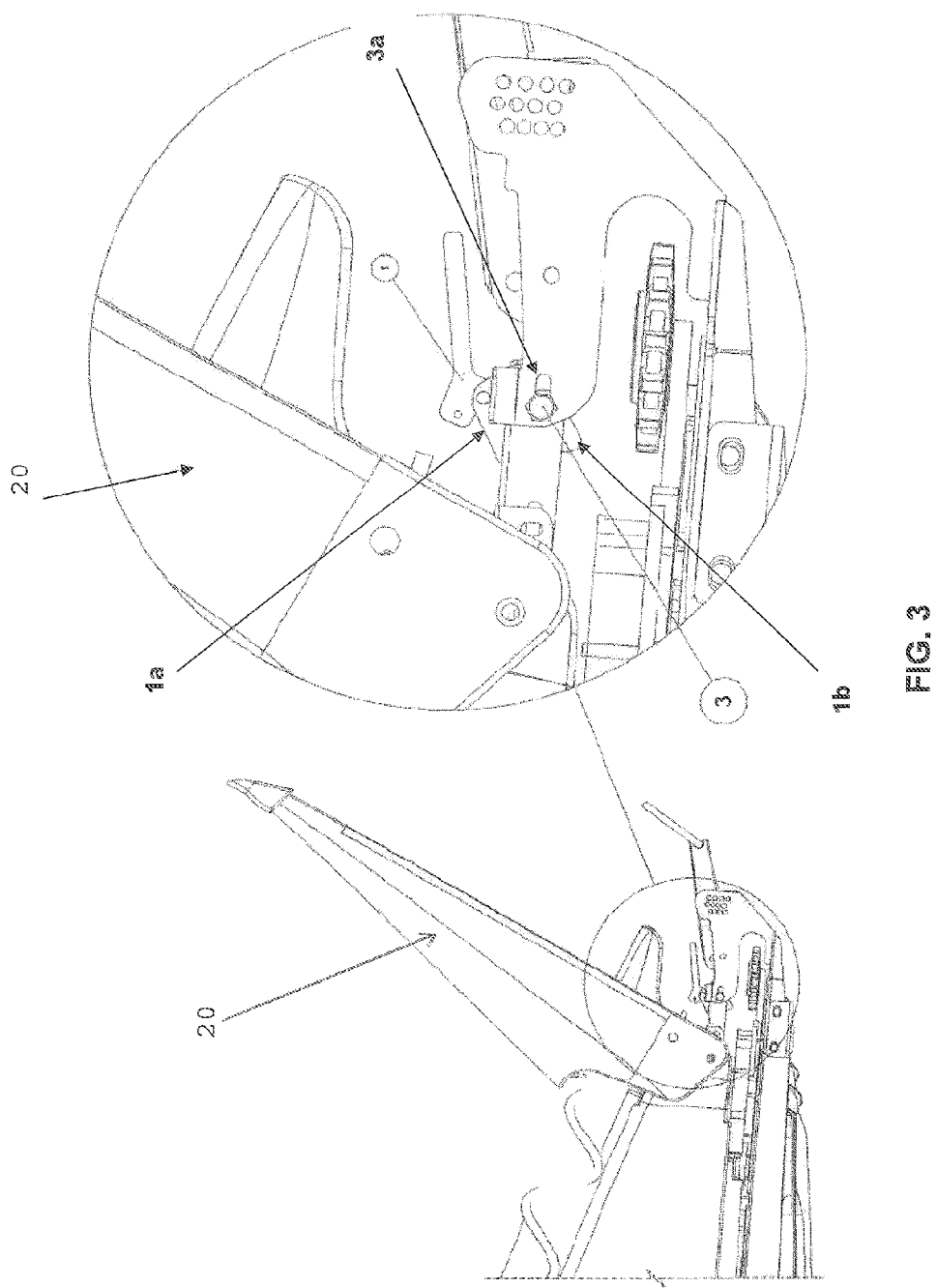
FIG. 3 illustrates a left side view of one of the lateral fingers of FIG. 1 including a detail view of the lock mechanism with a preferential trigger of the present invention.
Figure 4:
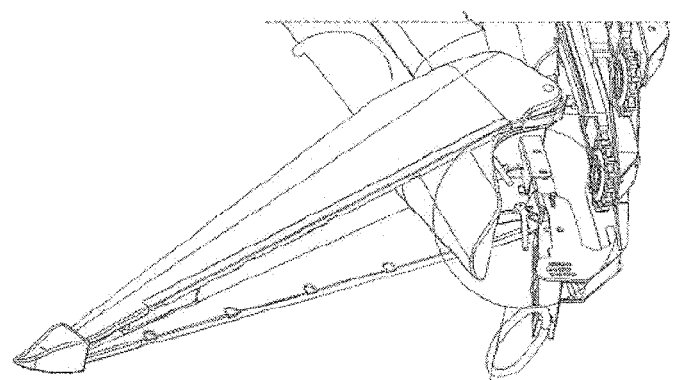
FIG. 4 illustrates a right side view of one of the lateral fingers of FIG. 1 including a detail of the lock mechanism with preferential trigger of the present invention.
Figure 4:
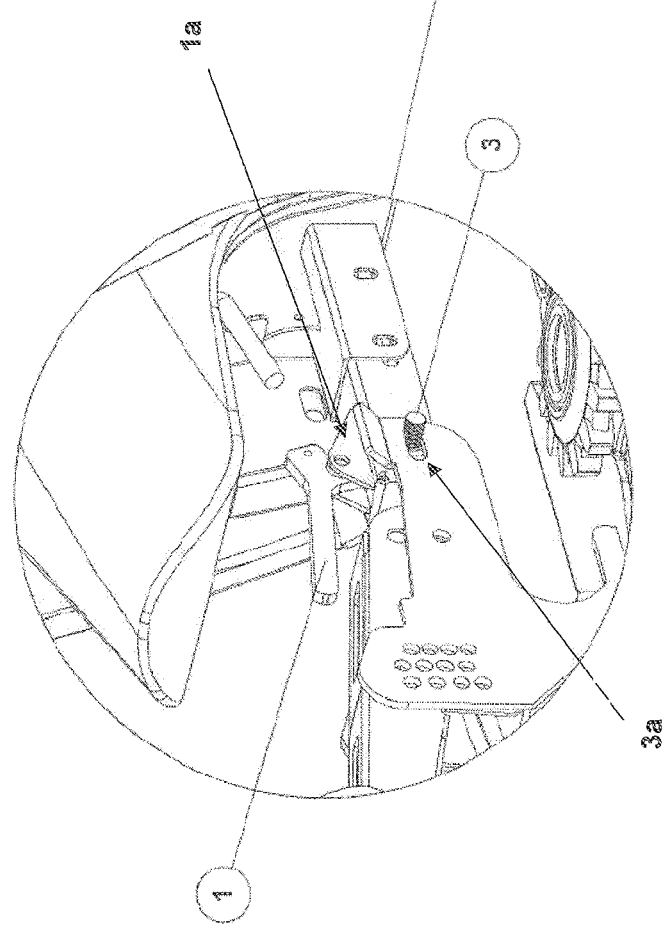

FIG. 2, shows the details of the left lateral finger 20. FIG. 2 clearly shows how the longitudinal edge A1 of the left lateral finger 20 turns according to the direction of the arrow C, making in its turn a horizontal substantial level, until it gets lined up or symmetrical regarding the edge 100 of the crop header 40.

The final positioning of the left lateral finger 20 allows to have access to the action controls (FIG. 11) of the crop header 40.

It can be observed on FIG. 2, the frame 7 is fixed to the crop header 40. The frame 7 permits the rotation of the hood 8 and the left lateral finger 20 against the edge 100 of the crop header 40.

FIGS. 3-7 show how a trigger 1 manages to lock the hood 8 and the left lateral finger 20, by joining a bush 4 (FIG. 7) and thereby preventing the lifting or turn of hood 8 and left lateral finger 20.

Figure 5:
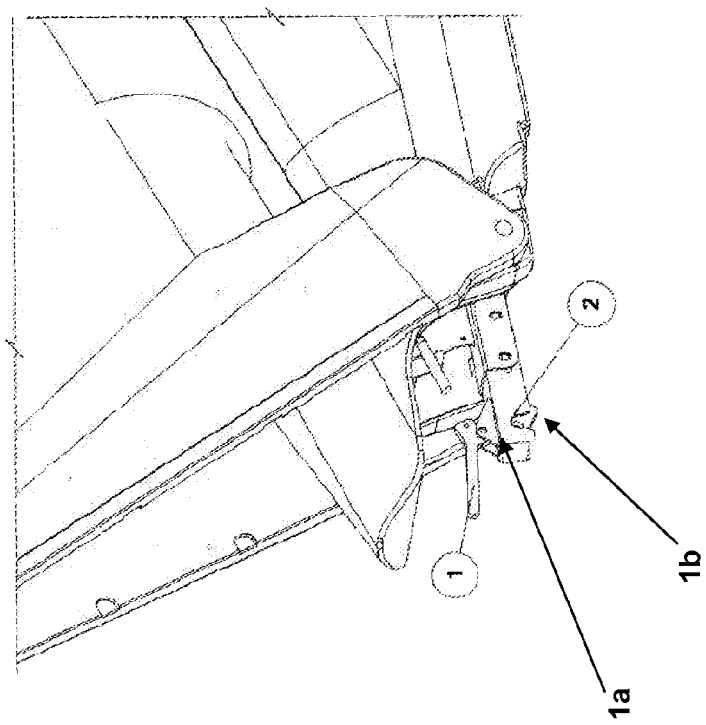
FIG. 5 illustrates a perspective front view of the lock mechanism with a decoupled trigger showing the lateral finger turning towards the crop header's.

A slot 2, which is visible in FIG. 5, allows the entering of the bush 4, which is tight with by a screw 3, therefore the regulation throughout slot 3a is possible to be registered.

In FIG. 5, it is shown that the trigger 1 is unlocked from the bush 4 which is pressed by the screw 3. The trigger 1 is fixed to an articulated piece 1a, which includes a locking device 1b.

Figure 6:
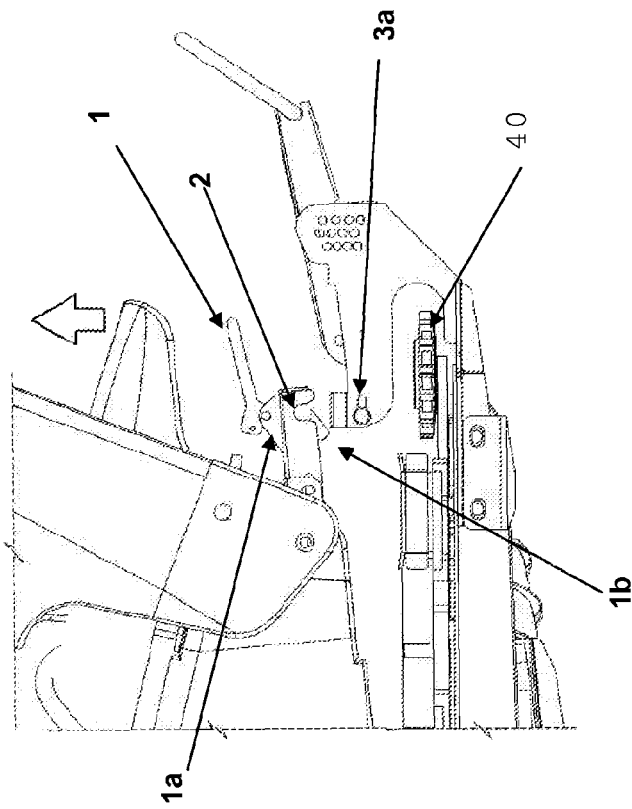
FIG. 6 illustrates a detailed view of the lock mechanism with preferential trigger of the present invention.
Figure 7:
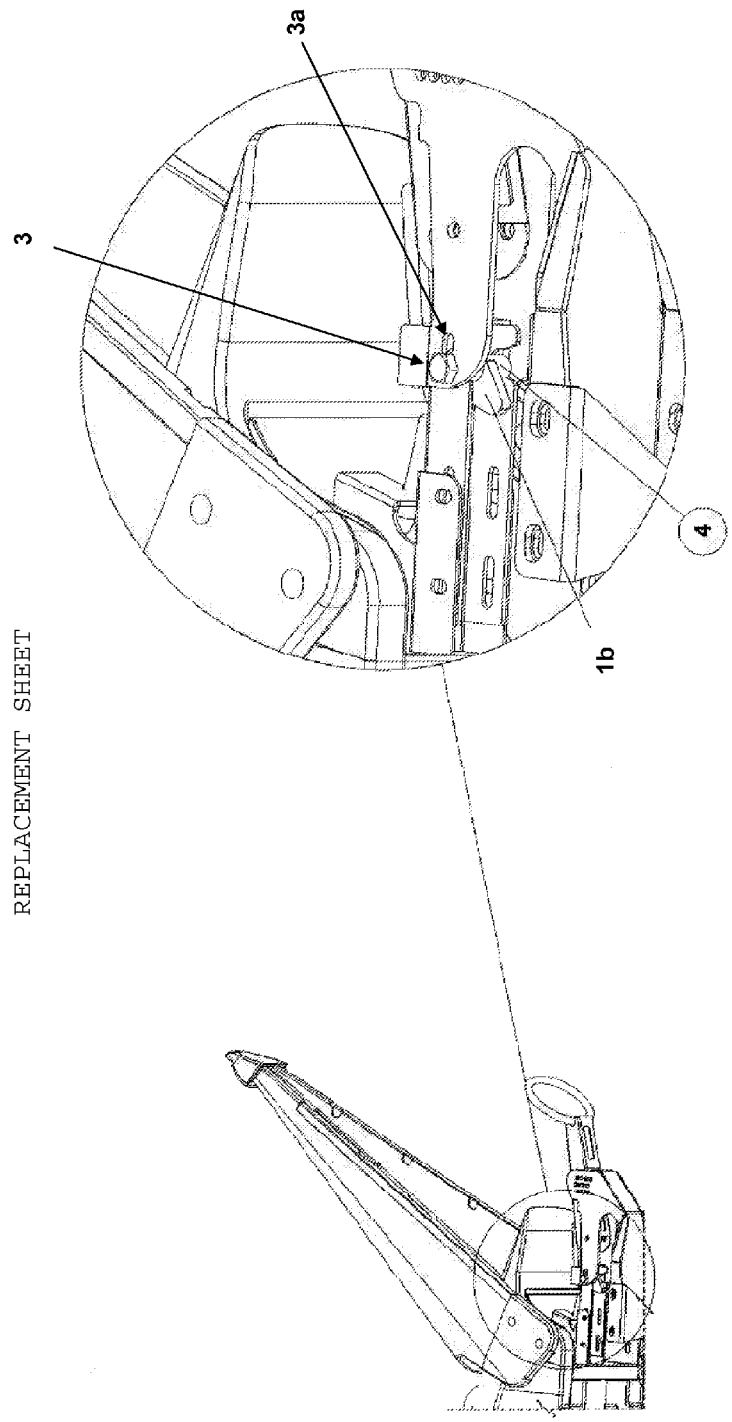
FIG. 7 illustrates a bottom perspective view of the locking mechanism including a detailed view of the lock mechanism with preferential trigger of the present invention.

In FIGS. 6 and 7, it is shown coupled and uncoupled, the locking device's 1b attaching detail with bush 4, therefore fixing the left lateral finger 20 and hood 8 preventing its turn. It can be seen that the screw 3 may be displaced throughout the slot 3a.

During its functioning, in order for the left lateral finger 20 and the right lateral finger 30 to move sideways, (which is a movement showed in FIG. 2), with arrow "C", the hood 8 must be lifted by pulling the trigger 1, which makes the locking device 1b to be uncoupled from the bush 4, producing in that way the uncoupling of the bush 4 and the slot 2. Therefore, allowing carrying out the lateral finger's 20, 30 to turn outwards from the crop header 40.

Figure 9:
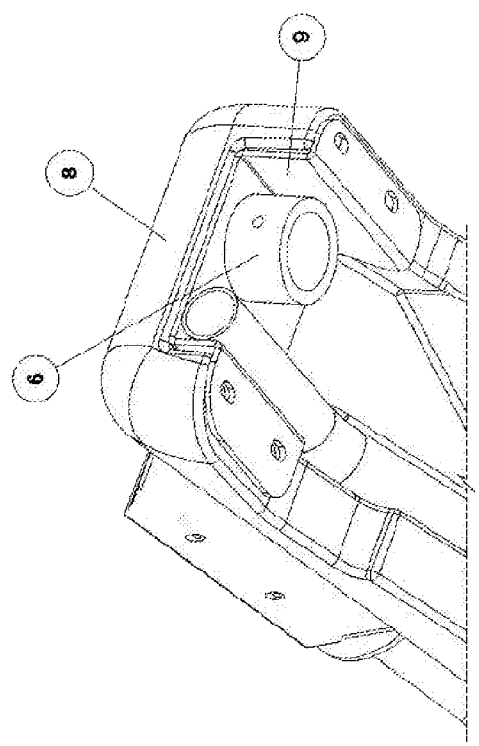
FIG. 9 bottom perspective view of the crop headers hood of the present invention.
Figure 8:
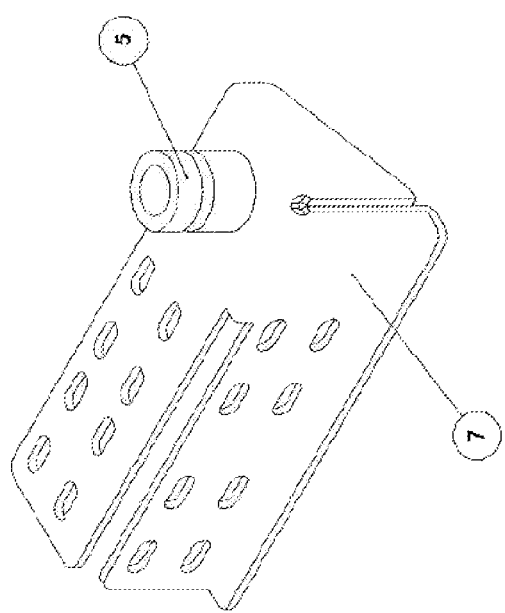
FIG. 8 is a perspective view of a frame bolted to the crop header's lateral edge of the harvester to allow the connection and hood articulation.
Figure 10:
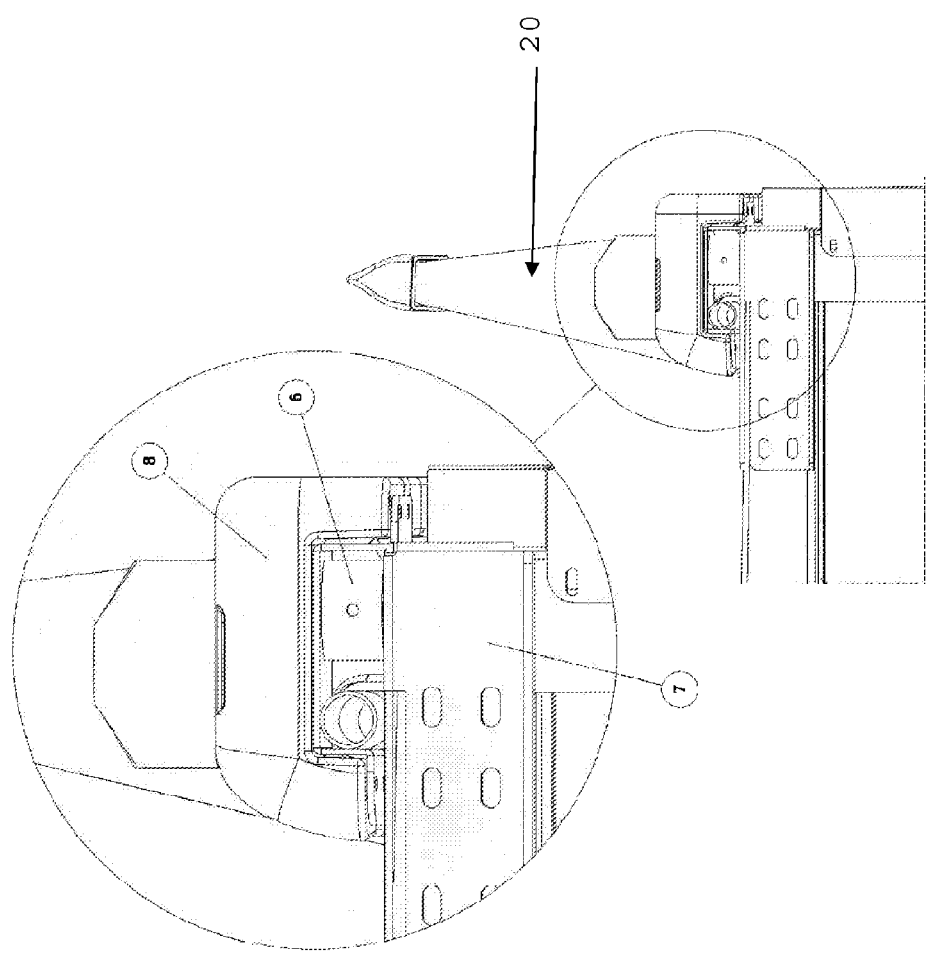
FIG. 10 shows an upper view and a detail of the hood and lateral finger.

FIGS. 8-10 show, the coupling of the hood 8 to the frame 7. The frame 7 is attached to the left lateral finger 20 of the crop header 40. The frame 7 includes a bolt 5 that connects to a bush 6 on the hood 8. It is against the bolt 5 where the hood 8 moves, enabling the hood 8 turn sideways.

The bush 6 is welded to piece 9, and this piece 9 being screwed to the hood 8.

Having described and specified the nature and scope of the invention as well as the way to implement it.

What is claimed is:

1. A crop header comprising:
a frame having a right side and a left side;
a right lateral finger including a right hood connected to the right side of the frame;
a left lateral finger including a left hood connected to the left side of the frame;
a first bolt located on the right side of the frame;
a first bush located on the right hood;
a second bolt located on the left side of the frame;
a second bush located on the left hood;
the second bush rotates on the second bolt rotating the left hood and the left lateral finger regarding the left side of the frame from a first position to a second position aligning the left hood and left lateral finger with the left side of the frame; and the first bush rotates on the first bolt rotating the right hood and the right lateral finger regarding the right edge of the frame from a third position to a fourth position aligning the right hood and the right lateral finger with the right side of the frame.

2. A crop header comprising:

a frame having a right side and a left side;

a right lateral finger including a right hood connected to the right side of the frame;

a left lateral finger including a left hood connected to the left side of the frame;

a first bolt located on the right side of the frame;

a first bush located on the right hood;

a second bolt located on the left side of the frame;

a second bush located on the left hood;

a trigger mechanism to lock the position of the left and right hoods and the left and right lateral fingers, the lifting mechanism includes a trigger, a bush, a slot, and a screw, the trigger pushed the bush through the slot and the screw locks by the bush on the slot;

the second bush rotates on the second bolt rotating the left hood and the left lateral finger regarding the left side of the frame from a first position to a second position aligning the left hood and left lateral finger with the left side of the frame; and the first bush rotates on the first bolt rotating the right hood and the right lateral finger regarding the right edge of the frame from a third position to a fourth position aligning the right hood and the right lateral finger with the right side of the frame.

3. The crop header according to claim 2, wherein the trigger mechanism is supported by an articulated piece in which a holding device is defined, which is secured to a bush adjustable in position by a screw.

4. A crop header consisting of:

a frame having a right side and a left side;

a right lateral finger including a right hood connected to the right side of the frame;

a left lateral finger including a left hood connected to the left side of the frame;

a first bolt located on the right side of the frame;

a first bush located on the right hood;

a second bolt located on the left side of the frame;

a second bush located on the left hood;

the second bush rotates on the second bolt rotating the left hood and the left lateral finger regarding the left side of the frame from a first position to a second position aligning the left hood and left lateral finger with the left side of the frame; and the first bush rotates on the first bolt rotating the right hood and the right lateral finger regarding the right edge of the frame from a third position to a fourth position aligning the right hood and the right lateral finger with the right side of the frame.

\* \* \* \* \*